United States Patent
Ito

(10) Patent No.: US 8,275,531 B2
(45) Date of Patent: Sep. 25, 2012

(54) TARGET TURNING VEHICLE SPEED SETTING APPARATUS AND BRAKING/DRIVING FORCE CONTROL APPARATUS

(75) Inventor: Yoshio Ito, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 491 days.

(21) Appl. No.: 12/529,550

(22) PCT Filed: Feb. 26, 2008

(86) PCT No.: PCT/JP2008/053290
§ 371 (c)(1),
(2), (4) Date: Sep. 2, 2009

(87) PCT Pub. No.: WO2008/108220
PCT Pub. Date: Sep. 12, 2008

(65) Prior Publication Data
US 2010/0100296 A1 Apr. 22, 2010

(30) Foreign Application Priority Data
Mar. 2, 2007 (JP) ................................. 2007-053391

(51) Int. Cl.
*G01C 21/00* (2006.01)
(52) U.S. Cl. ......................................................... 701/70
(58) Field of Classification Search ................... 701/70, 701/93; 340/905
See application file for complete search history.

(56) References Cited

U.S. PATENT DOCUMENTS

| 6,385,528 B1 * | 5/2002 | Takahashi ........................ 701/93 |
| 6,970,779 B2 * | 11/2005 | Kagawa et al. ................... 701/93 |
| 2005/0240334 A1 | 10/2005 | Matsumoto et al. |
| 2006/0190158 A1 * | 8/2006 | Shiiba et al. ..................... 701/70 |

FOREIGN PATENT DOCUMENTS

| JP | 9 96507 | 4/1997 |
| JP | 10 184903 | 7/1998 |
| JP | 3070194 | 7/2000 |
| JP | 2004 355266 | 12/2004 |
| JP | 2006 333456 | 12/2006 |

* cited by examiner

*Primary Examiner* — Joseph Rocca
(74) *Attorney, Agent, or Firm* — Oblon, Spivak, McClelland, Maier & Neustadt, L.L.P.

(57) ABSTRACT

A target turn vehicle speed setting device for setting a target turn vehicle speed according to the corner radii obtained from external information. A reference radius used for setting the target turn vehicle speed is set to a minimum value of the corner radii of points included in a corner successively obtained from the external information. When the values of the corner radii of the points decrease, the update of the reference radii is started. When the values of the corner radii increase, the update of the reference radii is ended. The target turn vehicle speed can be more appropriately determined.

12 Claims, 6 Drawing Sheets

TARGET TURNING VEHICLE SPEED SETTING APPARATUS AND BRAKING/DRIVING FORCE CONTROL APPARATUS

TECHNICAL FIELD

The present invention relates to a target turning vehicle speed setting apparatus and a braking/driving force control apparatus, and particularly relates to the target turning vehicle speed setting apparatus and the braking/driving force control apparatus for setting a target turning vehicle speed when a vehicle travels a corner based on radius information of a plurality of points included in the corner transmitted from the outside at any time.

BACKGROUND ART

A technique to set the target turning vehicle speed when the vehicle travels the corner based on the radius information of the corner in front of the vehicle is known. For example, Japanese Patent Application Laid-open No. H10-184903 (Patent Document 1) discloses the technique to detect node data from a navigation system device to obtain a node radius for each node, obtain a recommended travel speed in each node from the node radius, set a deceleration curve for each node, and determine an optimal gear position suitable for decelerating to the recommended travel speed from the deceleration curve.

Patent Document 1: Japanese Patent Application Laid-open No. H10-184903

DISCLOSURE OF INVENTION

Problem to be Solved by the Invention

The above-described patent document 1 does not disclose a method of calculating a target turning vehicle speed (recommended travel speed) in a case in which the radius information is momentarily detected with respect to one corner. When calculating the target turning vehicle speed for each momentarily detected radius information, if the detected radius changes from large to small then to large again, for example, the calculated target turning vehicle speed also changes from large to small then to large again, so that an effect of deceleration control carried out based on the target turning vehicle speed might change, thereby deteriorating drivability. It is desired that a more appropriate target turning vehicle speed is set.

An object of the present invention is to provide a target turning vehicle speed setting apparatus and a braking/diving force control apparatus capable of setting a more appropriate target turning vehicle speed.

Means for Solving Problem

A target turning vehicle speed setting apparatus according to the present invention is a target turning vehicle speed setting apparatus for setting a target turning vehicle speed based on a corner radius obtained from external information, wherein a reference radius when setting the target turning vehicle speed is set to a minimum value of values of the corner radius at a plurality of points included in a corner obtained from the external information at any time.

In the target turning vehicle speed setting apparatus according to the present invention, an update of the reference radius is started when the value of the corner radius at the plurality of points included in the corner obtained from the external information at any time decreases, and the update of the reference radius is finished when the value of the corner radius at the plurality of points included in the corner obtained from the external information at any time increases.

In the target turning vehicle speed setting apparatus according to the present invention, the update of the reference radius is finished without adopting the value of zero, after starting the update of the reference radius, when the value of the corner radius at the plurality of points included in the corner obtained from the external information at any time becomes zero.

In the target turning vehicle speed setting apparatus according to the present invention, the update of the reference radius is started, before starting the update of the reference radius, when the value of the corner radius at the plurality of points included in the corner obtained from the external information at any time is not larger than a value set in advance.

A braking/driving force control apparatus according to the present invention is a braking/driving force control apparatus for setting a target turning vehicle speed based on a corner radius obtained from external information and controlling braking/driving force based on the target turning vehicle speed, wherein a target turning vehicle speed set by the target turning vehicle speed setting apparatus is used as the target turning vehicle speed.

In the braking/driving force control apparatus according to the present invention, a braking/driving force control based on the target turning vehicle speed is permitted from after the update of the reference radius is finished.

Effect of the Invention

The target turning vehicle speed setting apparatus according to the present invention provides an effect that a more appropriate target turning vehicle speed can be set.

Figure 1:
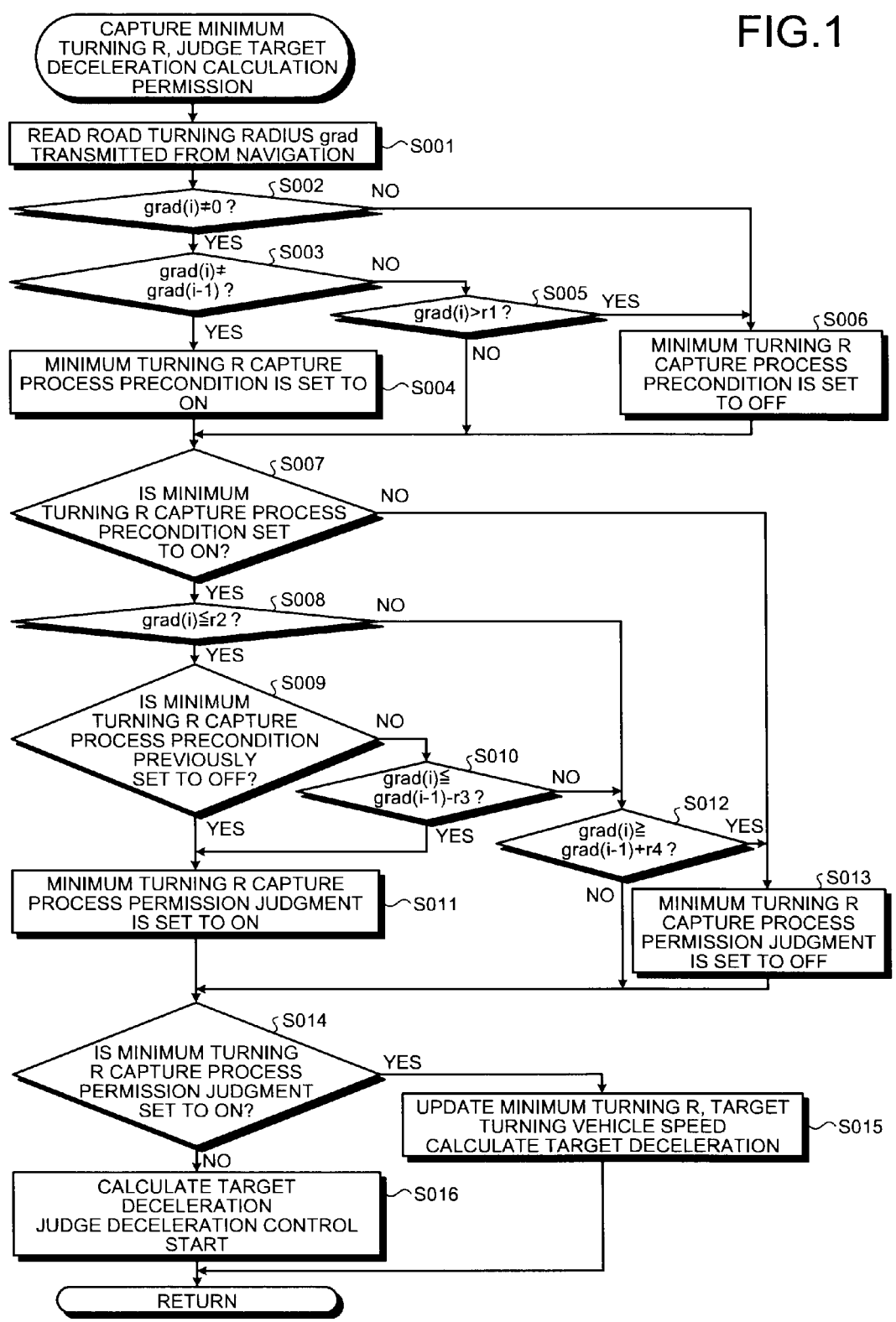
FIG. 1 is a flowchart illustrating operation of a first embodiment of a braking/driving force control apparatus according to the present invention.

EXPLANATIONS OF LETTERS OR NUMERALS 10 automatic transmission
40 engine
90 acceleration sensor
95 navigation system device
113 accelerator opening sensor
114 throttle opening sensor 116 engine rotation number sensor
122 vehicle speed sensor
123 shift position sensor
130 control circuit
131 CPU
133 ROM
200 brake device
230 brake control circuit
401 distance to corner entrance
402 road turning-radius transmitted from navigation system device
403 minimum turning-radius capture process precondition
404 minimum turning-radius capture process permission judgment
405 minimum turning-radius
406 actual vehicle speed
407 target turning vehicle speed
408 target deceleration
G1 first deceleration
G2 second deceleration
L distance to corner entrance
r1 first predetermined value
r2 second predetermined value

BEST MODE(S) FOR CARRYING OUT THE INVENTION

Hereinafter, one embodiment of a braking/driving force control apparatus according to the present invention is described in detail with reference to drawings.

First Embodiment

A first embodiment is described with reference to FIGS. 1, 2 and 5.

The present embodiment relates to the braking/driving force control apparatus that receives a road turning-radius R of a corner not larger than a predetermined turning-radius in a forward search range from a navigation system device, obtains a target turning vehicle speed Vt from the road turning-radius R and recommended turning lateral G, and calculates target deceleration based on a current vehicle speed V0, the target turning vehicle speed Vt, and a distance L to an entrance of the corner, thereby performing deceleration control by a brake and a shift down of a transmission.

In the above-described braking/driving force control apparatus, when calculating the target turning vehicle speed Vt and the target deceleration from the road turning-radius R and the recommended turning lateral G, by directly using information of the road turning-radius R, which momentarily changes with respect to one corner (radius information according to a shape of the corner) transmitted from the navigation system device at a predetermined distance before the corner, if the road turning-radius R changes, for example, from large to small then to large again, the target turning vehicle speed Vt changes from large to small then to large again, and the target deceleration changes from small to large then to small again, so that an effect of the deceleration control changes depending on detection timing of deceleration intention (accelerator off or brake on), which is a trigger condition of the deceleration control.

Therefore, in the present embodiment, a minimum turning-radius is captured from road turning-radius R information, which momentarily changes with respect to one corner (road turning-radius R information according to the corner shape), and the target turning vehicle speed Vt and the target deceleration are calculated from the minimum turning-radius and the recommended turning lateral G.

Also, in order to prevent the target turning vehicle speed Vt from changing, it is configured that the deceleration control is not carried out during a time period from a start of capture of the road turning-radius R to completion of the capture of the minimum turning-radius (refer to a time period between T2 and T3 in FIG. 2 to be described later).

At least the following three points are characteristics of a method of capturing the minimum turning-radius of the present embodiment.

(1) An ECU load increases always when carrying out a capture process of the minimum turning-radius, so that it is judged to permit the capture process of the above-described minimum turning-radius only when the road turning-radius R transmitted from the navigation system device is within a predetermined value set in advance (refer to a second predetermined value r2 in FIG. 2 to be described later).

(2) When a corner interval is small, the information of the road turning-radius R is continuously transmitted, so that the capture process of the minimum turning-radius starts when the transmitted road turning-radius R decreases. However, there is a case in which the information of a small road turning-radius R is suddenly transmitted (refer to FIG. 3 to be described in a second embodiment) such as when recovering from communication failure (for example, when GPS information cannot be received by the navigation system device), so that the capture process of the minimum turning-radius starts when the road turning-radius R is within the predetermined value set in advance and when the capture process of the minimum turning-radius is permitted (step S011 in FIG. 1 to be described later) (step S015).

(3) Judgment of the capture completion of the minimum turning-radius is performed when the transmitted road turning-radius R increases (step S012). However, there is a case in which the information of the road turning-radius R suddenly disappears, and turning-radius R=0 due to the communication failure (refer to FIG. 4 to be described in a third embodiment), so that the capture process of the minimum turning-radius is forbidden at the time of the communication failure and update of the minimum turning-radius is stopped (step S002 (No)→step S006→step S007 (No)→step S013).

As a configuration of the present embodiment is provided with means for detecting road shape information (a corner R and a distance from the subject vehicle to the corner) in front of the vehicle, and at least one deceleration control device such as an automatic brake actuator, a regenerative brake, an automatic transmission capable of down shift control, and an electronic control throttle, capable of controlling deceleration of the subject vehicle as described below in detail.

Figure 5:
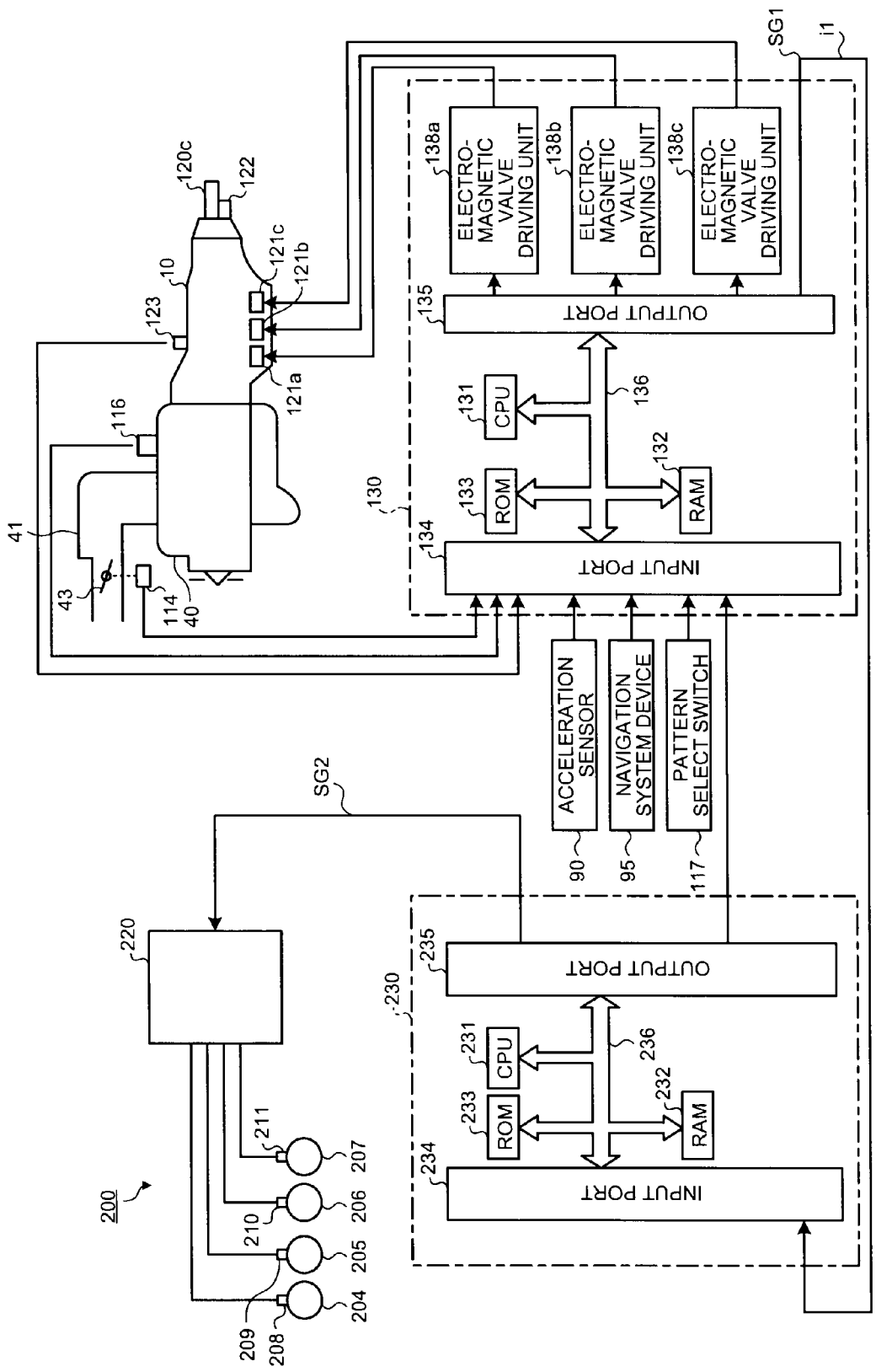
FIG. 5 is a schematic configuration diagram of the first embodiment of the braking/driving force control apparatus according to the present invention.

In FIG. 5, reference numerals 10, 40 and 200 represent a stepped automatic transmission, an engine, and a brake device, respectively. The automatic transmission 10 is capable of providing five speeds by controlling hydraulic pressure by energization/non-energization to electromagnetic valves 121a, 121b and 121c. Although three electromagnetic valves 121a, 121b and 121c are shown in FIG. 5, the number of the electromagnetic valves is not limited to three. The electromagnetic valves 121a, 121b and 121c are driven by a signal from a control circuit 130.

An accelerator opening sensor 113 detects accelerator opening. A throttle opening sensor 114 detects opening of a throttle valve 43 arranged in an air intake path 41 of the engine 40. An engine rotation number sensor 116 detects a rotation number of the engine 40. A vehicle speed sensor 122 detects the rotation number of an output shaft 120c of the automatic transmission 10, which is in proportion to the vehicle speed.

A shift position sensor 123 detects a shift position. A pattern select switch 117 is used when instructing a transmission pattern. An acceleration sensor 90 detects deceleration (decelerating acceleration) of the vehicle.

A fundamental function of a navigation system device 95 is to guide the own vehicle to a predetermined destination, and the navigation system device 95 is provided with an arithmetic processing unit, an information storing medium in which information required for travel of the vehicle (such as a map, a straight pathway, a curve, an upslope/downslope and an express way) is stored, a first information detection device including a geomagnetic sensor, a gyrocompass and a steering sensor, for detecting a current position of the subject vehicle and a road condition by autonomous navigation, and a second information detection device including a GPS antenna and a GPS receiver, for detecting the current position of the own vehicle and the road condition by electric navigation.

The control circuit 130 inputs signals indicating detection results of the accelerator opening sensor 113, the throttle opening sensor 114, the engine rotation number sensor 116, the vehicle speed sensor 122, the shift position sensor 123 and the acceleration sensor 90, inputs a signal indicating a switching state of the pattern select switch 117, and inputs a signal from the navigation system device 95.

The control circuit 130 is composed of a well-known microcomputer, and is provided with a CPU 131, a RAM 132, a ROM 133, an input port 134, an output port 135 and a common bus 136. The signals from the above-described sensors 113, 114, 116, 123 and 90, the signal from the above-described switch 117, and the signal from the navigation system device 95 are input to the input port 134. Electromagnetic valve driving units 138a, 138b and 138c, and a brake braking force signal line L1 to a brake control circuit 230 are connected to the output port 135. A brake braking force signal SG1 is transmitted through the brake braking force signal line L1.

Figure 6:
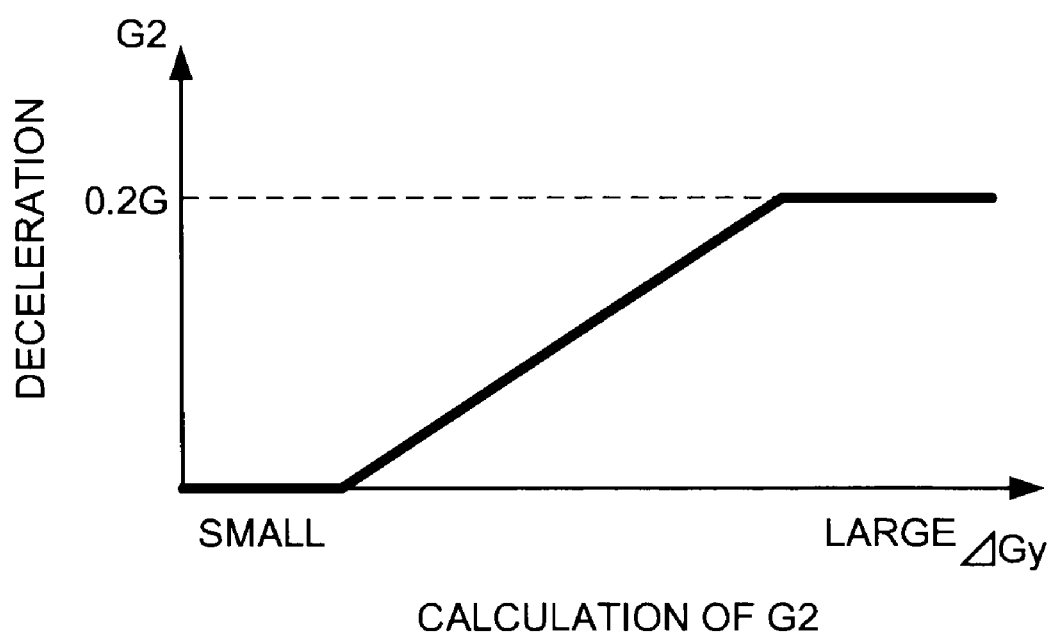
FIG. 6 is a view for illustrating a method of obtaining second deceleration in the first embodiment of the braking/driving force control apparatus according to the present invention.

In the ROM 133, operation (control step) shown in a flowchart in FIG. 1 and a map shown in FIG. 6 are stored in advance, and operation of shift control (not shown) is stored. The control circuit 130 controls gear shift of the automatic transmission 10 based on input various control conditions.

The brake device 200 is controlled by the brake control circuit 230 for inputting the brake braking force signal SG1 from the control circuit 130, thereby braking the vehicle. The brake device 200 is provided with a hydraulic control circuit 220 and brake devices 208, 209, 210 and 211 provided on wheels 204, 205, 206 and 207 of the vehicle, respectively. The brake devices 208, 209, 210 and 211 control braking force of corresponding wheels 204, 205, 206 and 207 by braking hydraulic pressure controlled by the hydraulic control circuit 220. The hydraulic control circuit 220 is controlled by the brake control circuit 230.

The hydraulic control circuit 220 performs the brake control by controlling the braking hydraulic pressure to be supplied to the brake devices 208, 209, 210 and 211 based on a brake control signal SG2. The brake control signal SG2 is generated by the brake control circuit 230 based on the brake braking force signal SG1. The brake braking force signal SG1 is output from the control circuit 130 of the automatic transmission 10 and is input to the brake control circuit 230. Braking force to be provided to the vehicle at the time of the brake control is defined by the brake control signal SG2 generated by the brake control circuit 230 based on various data included in the brake braking force signal SG1.

The brake control circuit 230 is composed of a well-known microcomputer and is provided with a CPU 231, a RAM 232, a ROM 233, an input port 234, an output port 235 and a common bus 236. The hydraulic control circuit 220 is connected to the output port 235. Operation when generating the brake control signal SG2 based on the various data included in the brake braking force signal SG1 is stored in the ROM 233. The brake control circuit 230 performs control of the brake device 200 (brake control) based on input various control conditions.

Next, operation of the present embodiment is described with reference to FIGS. 1 and 2.

Here, the minimum turning-radius is captured and calculation permission of the target deceleration is judged.

Figure 2:
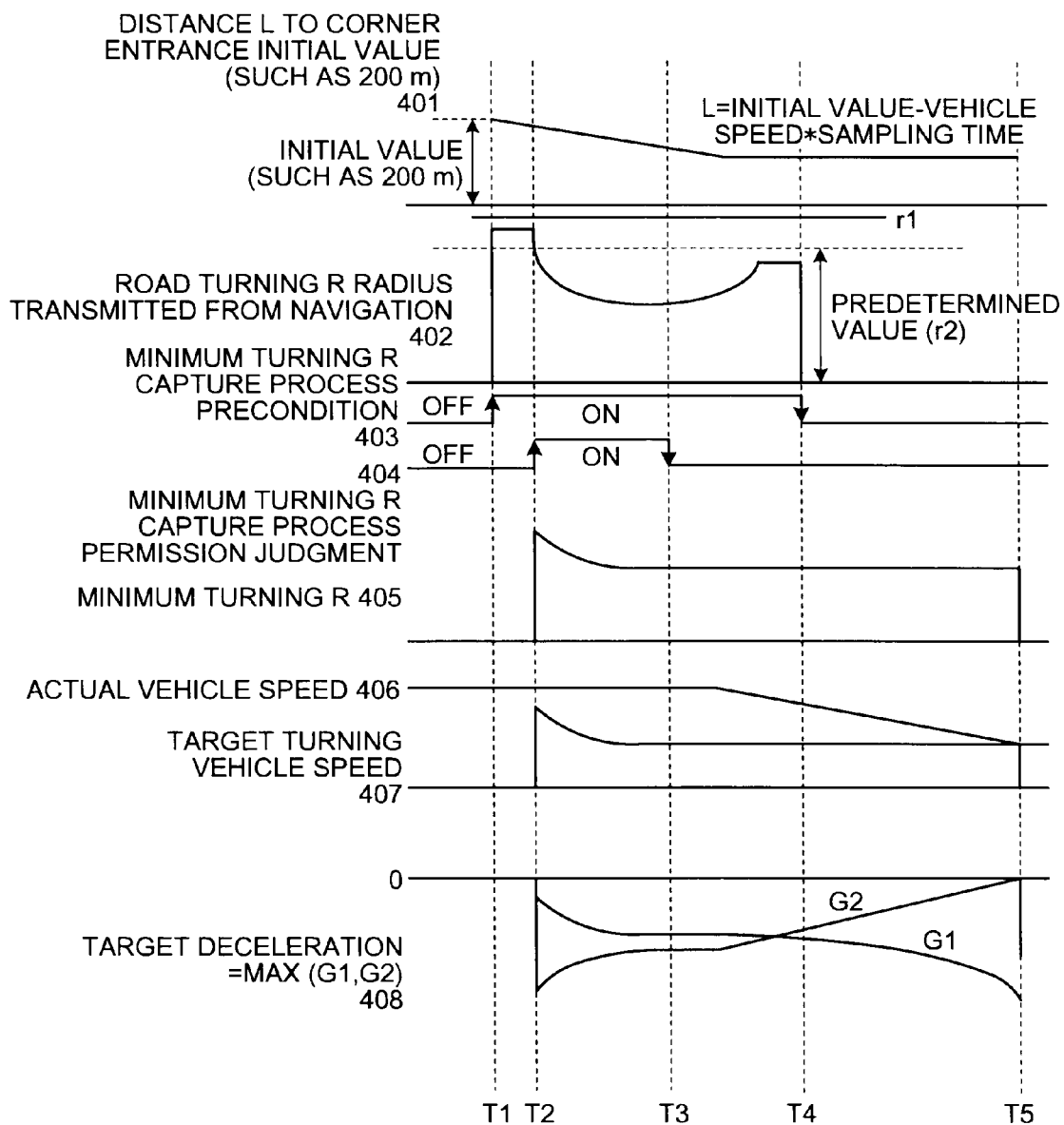
FIG. 2 is a time chart illustrating the operation of the first embodiment of the braking/driving force control apparatus according to the present invention.

In FIG. 2, a reference numeral 401 represents the distance L to the corner entrance. L is obtained by an equation, initial value (200 m, in this example)−vehicle speed*sampling time. A reference numeral 402 represents the road turning-radius transmitted from the navigation system device 95. A reference numeral 403 represents a minimum turning-radius capture process precondition. A reference numeral 404 represents a minimum turning-radius capture process permission judgment. A reference numeral 405 represents the minimum turning-radius. A reference numeral 406 represents an actual vehicle speed. A reference numeral 407 represents the target turning vehicle speed. A reference numeral 408 represents the target deceleration. Meanwhile, initial values of the minimum turning-radius capture process precondition 403 and the minimum turning-radius capture process permission judgment 404 are set to OFF.

Hereinafter, the operation in FIG. 1 is described, and thereafter FIG. 2 is described in detail.

[Step S001]

At a step S001, a road turning-radius grad of the road in the forward search range of the vehicle set in advance transmitted from the navigation system device 95 is read. That is to say, information of the radius grad of one certain point included in one corner transmitted from the navigation system device 95 is read.

In each cycle of a control flow shown in FIG. 1, which is repeatedly carried out, each time the step S001 is carried out, the information of the road turning-radius grad along the shape of the corner, which momentarily changes with respect to one corner, is transmitted at any time from the navigation system device 95. The above-described forward search range is 200 m, for example, in an example shown in FIG. 2.

[Step S002]

At a step S002, it is judged whether the road turning-radius grad(i) read at the above-described step S001 is a value other than 0. As a result of the judgment, when it is judged that the road turning-radius grad(i) is the value other than 0, a procedure shifts to a step S003, and if this is not the case, the procedure shifts to a step S006.

[Step S003]

At the step S003, it is judged whether the road turning-radius grad(i) read at the above-described step S001 changes from a road turning-radius grad(i−1) read at the above-described step S001 in a previous cycle of the control flow. As a result of the judgment, when this is changed, the procedure shifts to a step S004, and if this is not the case, the procedure shifts to a step S005. When the value is changed from the value in the previous cycle, it is judged that this may be a minimum value of the road turning-radius (minimum turning-radius), and the procedure shifts to the step S004.

[Step S004]

At the step S004, the minimum turning-radius capture process precondition is set to ON. After the step S004, the procedure shifts to a step S007.

[Step S005]

At the step S005, it is judged whether the road turning-radius grad(i) (402) read at the above-described step S001 is larger than a first predetermined value r1 set in advance. As a result of this judgment, when this turns out positive, the procedure shifts to the step S006, and if this is not the case, the procedure shifts to the step S007.

The first predetermined value r1 is a value not smaller than a second predetermined value r2 to be described later. The first predetermined value r1 is a threshold value for judging that it is not necessary to set the minimum turning-radius capture process precondition 403 to ON when the road turning-radius grad(i) (402) is larger than the first predetermined value r1.

[Step S006]

At the step S006, the minimum turning-radius capture process precondition 403 is set to OFF. This is because the step S006 is carried out when the road turning-radius grad(i) read at the above-described step S001 is 0 (step S002 (No)) or when the road turning-radius grad(i) read at the above-described step S001 is larger than the first predetermined value r1 set in advance (step S005 (No)), and it is not necessary to carry out the capture process of the minimum turning-radius in such cases. After the step S006, the procedure shifts to the step S007.

[Step S007]

At the step S007, it is judged whether the minimum turning-radius capture process precondition is set to ON. As a result of the judgment, when this turns out positive, the procedure shifts to a step S008, and if this is not the case, the procedure shifts to a step S013.

[Step S008]

At the step S008, it is judged whether the road turning-radius grad(i) read at the above-described step S001 is not larger than the second predetermined value r2 set in advance. As a result of the judgment, when this turns out positive, the procedure shifts to a step S009, and if this is not the case, the procedure shifts to a step S012.

This is because, when the road turning-radius grad(i) is larger than the second predetermined value r2, the corner control (deceleration control by the present embodiment, step S016) is not carried out even if the road turning-radius grad(i) is the minimum turning-radius. Here, the second predetermined value r2 may be 100 to 200 m, for example.

[Step S009]

At the step S009, it is judged whether the minimum turning-radius capture process precondition was set to OFF in the previous cycle of the control flow. As a result of this judgment, when this turns out positive, the procedure shifts to a step S011, and if this is not the case, the procedure shifts to a step S010.

[Step S010]

At the step S010, it is judged whether the road turning-radius grad(i) read at the above-described step S001 is not larger than a value obtained by subtracting a third predetermined value r3 set in advance from the road turning-radius grad(i−1) read at the above-described step S001 in the previous cycle of the control flow. As a result of this judgment, when this turns out positive, the procedure shifts to the step S011, and if this is not the case, the procedure shifts to the step S012.

At the step S010, it is judged whether the road turning-radius grad(i) decreases by a value not smaller than the third predetermined value r3 from the road turning-radius grad(i−1) in the previous cycle. Here, the third predetermined value r3 is set to a value such that decrease in the road turning-radius grad(i) is recognized.

[Step S011]

At the step S011, the minimum turning-radius capture process permission judgment (404) is set to ON. After the step S011, the procedure shifts to a step S014.

[Step S012]

At the step S012, it is judged whether the road turning-radius grad(i) read at the above-described step S001 is not smaller than a value obtained by adding a fourth predetermined value r4 set in advance to the road turning-radius grad(i−1) read at the above-described step S001 in the previous cycle. As a result of the judgment, if this turns out positive, the procedure shifts to the step S013, and if this is not the case, the procedure shifts to the step S014.

At the step S012, it is judged whether the road turning-radius grad(i) increases by a value not smaller than the fourth predetermined value r4 from the road turning-radius grad(i−1) in the previous cycle. Here, the fourth predetermined value r4 is set to a value such that increase in the road turning-radius grad(i) is recognized.

[Step S013]

At the step S013, the minimum turning-radius capture process permission judgment 404 is set to OFF. After the step S013, the step S014 is carried out.

[Step S014]

At the step S104, it is judged whether the minimum turning-radius capture process permission judgment is set to ON. As a result of the judgment, if it is judged that the minimum turning-radius capture process permission judgment is set to ON, the procedure shifts to a step S015, and if this is not the case, the procedure shifts to a step S016.

[Step S015]

At the step S015, the capture process of the minimum turning-radius 405 is carried out. In the capture process of the minimum turning-radius 405, the road turning-radius grad(i) read at the above-described step S001 in each cycle is updated at any time as the minimum turning-radius 405.

Also, at the step S015, the target turning vehicle speed 407 is updated. The target turning vehicle speed 407 is obtained as Vreq [m/s] in the following equation 1. In the following equation 1, by assigning the value of the above-described minimum turning-radius 405, which is updated at any time, to the corner R, the target turning vehicle speed 407 is updated at any time.

[Equation 1]

$$V_{req} = \sqrt{R \times G_{yt} \times g} \tag{1}$$

where

R: corner R[m]

Gyt: target lateral G appropriate value (such as 0.4 G)

g: gravity acceleration 9.8[m/s$^2$].

Also, at the step S015, the target deceleration 408 is calculated. In FIG. 2, a first deceleration G1 and a second deceleration G2 are compared with each other, and as a result of the comparison, a larger value is set to the target deceleration 408. The first and second decelerations G1 and G2 correspond to Greqx and Greqy, respectively, in Japanese Patent Application Laid-open No. 2006-256593. That is to say, the first deceleration G1 is calculated by the following equation 2. In the following equation 2, the target turning vehicle speed 407 calculated at the step S015 is assigned to Vreq, and the first deceleration G1 is updated at any time depending on the distance L to the corner entrance. The second deceleration G2 is obtained by the following equation 3.

[equation 2]
$$G1 = \frac{V^2 - Vreq^2}{2 \times L \times g} \quad (2)$$

where
V: current vehicle speed [m/s]
L: distance from the vehicle to the corner entrance [m].

[Equation 3]
$$G2 = f\{\Delta Gy\} \quad (3)$$
where
ΔGy: difference between the target lateral G and a predicted lateral G $\Delta Gy = Gyf - Gyt$.

The above-described predicted lateral G is the lateral G when entering the corner at the current vehicle speed V, and when the predicted lateral G is set to Gyf, is obtained by the following equation 4.

[equation 4]
$$Gyf = \frac{V^2}{R \times g}. \quad (4)$$

In the above-described equation 4, the above-described value of the minimum turning-radius 405 updated at any time is assigned to R, and thereby the predicted lateral G is updated at any time.

For example, the second deceleration G2 may be obtained based on the lateral G difference ΔGy according to relationship (map) set in advance, as shown in FIG. 6.

While at the step S015 the target deceleration 408 is obtained, the deceleration control based on the target deceleration 408 is not carried out. During a time period during which the step S015 is carried out, that is to say, a time period during which the minimum turning-radius capture process permission judgment 404 is set to ON (step S014 (Yes)), the road turning-radius grad(i) decreases from the road turning-radius grad(i−1) in the previous cycle (step S010 (Yes)), and the minimum turning-radius 405 of the corner is not defined yet (capture of the minimum turning-radius 405 is not completed yet). Therefore, in this stage, the target turning vehicle speed 407 changes. Therefore, the deceleration control is not carried out during the time period in which the step S015 is carried out.

[Step S016]

At the step S016, the start of the deceleration control based on the target deceleration is permitted. That is to say, as described above, the target deceleration 408 is obtained based on the newest minimum turning-radius 405 and target turning vehicle speed 407 updated at any time at the step S015, and the deceleration control is started based on the target deceleration 408. That is to say, at the step S016, the update of the minimum turning-radius 405 and the target turning vehicle speed 407 is not performed. The target deceleration 408 changes according to the distance L (401) to the corner entrance, so that the target deceleration 408 is calculated in the step S016 of each cycle. After the step S016, this control flow is returned.

Next, the operation of the present embodiment is described with reference to FIG. 2.

[Operation at Time Point T1]

First, reading of the road turning-radius grad(i) (reference numeral 402) (step S001) is carried out (started) at timing T1 in FIG. 2. Then, since the road turning-radius grad(i) (402) is not 0 at the timing T1 (step S002 (Yes)), the procedure shifts to the step S003. At the timing T1, since the value in the previous cycle is not present, the step S003 turns out positive and the procedure shifts to the step S004, the minimum turning-radius capture process precondition 403 is set to ON, and the step S007 turns out positive and the procedure shifts to the step S008.

At the timing T1, since the road turning-radius grad(i) (402) is larger than the predetermined value r2, the step S008 turns out negative and the procedure shifts to the step S012.

At a time point T1, since the road turning-radius grad(i) (402) increases from the road turning-radius grad (i−1) in the previous cycle, the step S012 turns out positive and the procedure shifts to the step S013. Then, the minimum turning-radius capture process permission judgment 404 is set to OFF at the step S013 and the procedure shifts to the step S014.

At the time point T1, since the minimum turning-radius capture process permission judgment 404 is set to OFF, the step S014 is denied and the procedure shifts to the step S016. At the step S016, although the deceleration control is started based on the minimum turning-radius 405 calculated at the step S015 and the target deceleration calculated based on the target turning vehicle speed 407, the step S015 is not carried out yet at the time point T1 and the minimum turning-radius 405 and the target turning-radius 407 are not calculated, so that the target deceleration 408 is not calculated and the deceleration control is not carried out.

As described above, the operation at the time point T1 is such that the step S001→the step S002 (Yes)→the step S003 (Yes)→the step S004→the step S007 (Yes)→the step S008 (No)→the step S012 (Yes)→the step S013→the step S014 (No)→the step S016.

[Time Period after Time Point T1 Until Time Point T2]

During a time period after the time point T1 until a time point T2, since the road turning-radius grad(i) (402) read at the above-described step S001 is not 0, the step S002 turns out positive and the procedure shifts to the step S003, and since the road turning-radius grad(i) does not change from the road turning-radius grad(i−1) read at the above-described step S001 in the previous cycle, the step S003 turns out negative and the procedure shifts to the step S005. Since the road turning-radius grad(i) (402) is not larger than the first predetermined value r1, the step S005 turns out negative and the procedure shifts to the step S007.

That is to say, during the time period after the time point T1 until the time point T2, the step S006 is not carried out, so that the minimum turning-radius capture process precondition 403, which is set to ON at the time point T1, is not set to OFF. Therefore, the step S007 turns out positive and the procedure shifts to the step S008.

During the time period after the time point T1 until the time point T2, the road turning-radius grad(i) (402) is larger than the predetermined value r2, so that the step S008 turns out negative and the procedure shifts to the step S012.

During the time period after the time point T1 until the time point T2, the road turning-radius grad(i) (402) does not increase from the road turning-radius grad (i−1) in the previous cycle, so that the step S012 turns out negative and the procedure shifts to the step S014.

During the time period after the time point T1 until the time point T2, the minimum turning-radius capture process permission judgment 404 is set to OFF, so that the step S014 turns out negative and the procedure shifts to the step S016. At the step S016, although the deceleration control is started based on the minimum turning-radius 405 calculated at the step S015 and the target deceleration calculated based on the target turning vehicle speed 407, the step S015 is not carried out yet during the time period after the time point T1 until the time point T2, and the minimum turning-radius 405 and the target turning vehicle speed 407 are not calculated, so that the target deceleration 408 is not calculated and the deceleration control is not carried out.

As described above, the operation after the time point T1 until the time point T2 is such that the step S001→the step S002 (Yes)→the step S003 (No)→the step S005 (No)→the step S007 (Yes)→the step S008 (No)→the step S012 (No)→the step S014 (No)→the step S016.

[Time Point T2]

At the timing T2, since the road turning-radius grad (i) (402) read at the above-described step S001 is not 0, the step S002 turns out positive and the procedure shifts to the step S003, and since the road turning-radius grad(i) changes from the road turning-radius grad(i−1) read at the above-described step S001 in the previous cycle, the step S003 turns out positive and the procedure shifts to the step S004. At the step S004, the minimum turning-radius capture process precondition 403 is set to ON (the minimum turning-radius capture process precondition 403 is already set to ON at the time point T2). Therefore, the step S007 turns out positive and the procedure shifts to the step S008.

At the time point T2, since the road turning-radius grad(i) (402) is smaller than the predetermined value r2, the step S008 turns out positive and the procedure shifts to the step S009. At the time point T2, the minimum turning-radius capture process precondition 403 is not set to OFF in the previous cycle, the step S009 turns out negative and the procedure shifts to the step S010. At the time point T2, since the road turning-radius grad(i) (402) decreases from the road turning-radius grad(i−1) in the previous cycle, the step S010 turns out positive and the procedure shifts to the step S011. Therefore, at the time point T2, the minimum turning-radius capture process permission judgment (404) is set to ON (step S011), and the following step S014 turns out positive and the procedure shifts to the step S015.

Therefore, at the time point T2, the step S015 is carried out and the capture process of the minimum turning-radius 405 is carried out. That is to say, the road turning-radius grad(i) read at the above-described step S001 in each cycle is updated at any time as the minimum turning-radius 405, the target turning vehicle speed 407 is updated, and the target deceleration 408 is calculated. At the time point T2, the step S015 has been carried out, so that the deceleration control is not carried out.

As described above, the operation at the time point T2 is such that the step S001→the step S002 (Yes)→the step S003 (Yes)→the step S004→the step S007 (Yes)→the step S008 (No)→the step S009 (No)→the step S010 (Yes)→the step S011→the step S014 (Yes)→the step S015.

[Time Period after Time Point T2 Until Time Point T3]

Operation during a time period after the time point T2 until a time point T3 is similar to the operation at the above-described time point T2.

[Time Point T3]

At the time point T3, operation in the order of the step S001→the step S002 (Yes)→the step S003 (Yes)→the step S004→the step S007 (Yes)→the step S008 (Yes)→the step S009 (No) is carried out. At the time point T3, it is detected that the road turning-radius grad(i) (402) has stopped decreasing and started increasing. Therefore, at the time point T3, it is judged that the road turning-radius grad(i) (402) does not decrease by a value not smaller than the third predetermined value r3 from the road turning-radius grad(i−1) in the previous cycle (step S010 (No)), and it is judged that the road turning-radius grad(i) (402) increases by a value not smaller than the fourth predetermined value r4 from the road turning-radius grad (i−1) in the previous cycle (step S012 (Yes)), so that the procedure shifts to the step S013. At the step S013, when the minimum turning-radius capture process permission judgment 404 is set to OFF, the step S014 turns out negative. Thereby, the update of the minimum turning-radius 405 and the target turning vehicle speed 407 (step S015) is not carried out, the target deceleration 408 is obtained based on the newest (at the time point T3) minimum turning-radius 405 and target turning vehicle speed 407 at the step S016, and the deceleration control is started based on the target deceleration 408. Thereby, the actual vehicle speed 406 decreases some time after the time point T3.

[Time Period after Time Point T3 Until Time Point T4]

To the middle of a time period after the time point T3 until a time point T4, the operation is similar to the operation at the above-described time point T3. From the middle of the time period after the time point T3 until the time point T4, operation in the order of the step S001→the step S002 (Yes)→the step S003 (No)→the step S005 (No)→the step S007 (Yes)→the step S008 (Yes)→the step S009 (No)→the step S010 (No)→the step S012 (No)→the step S014 (No)→the step S016 is carried out.

[Time Point T4]

At the time point T4, since the road turning-radius grad(i) (402) is 0, the step S002 turns out negative and the procedure shifts to the step S006, and the minimum turning-radius capture process precondition 403 is set to OFF. Since the following step S007 turns out negative, the procedure shifts to the step S013. At the step S013, the minimum turning-radius capture process permission judgment 404 is set to OFF (it is already set to OFF at the time point T3, in this example). In this case, since the step S014 also turns out negative, the deceleration control is continuously carried out at the step S016.

[After Time Point T4]

After the time point T4, operation is similar to the operation at the above-described time point T4.

According to the present embodiment, the following effect can be obtained.

According to the present embodiment, the minimum turning-radius (final updated value of the minimum turning-radius 405) can be captured from the road turning-radius R information, which momentarily changes with respect to one corner (the road turning-radius R information according to the corner shape). Thereby, the target turning vehicle speed is prevented from varying according to the corner shape of one corner.

Second Embodiment

Figure 3:
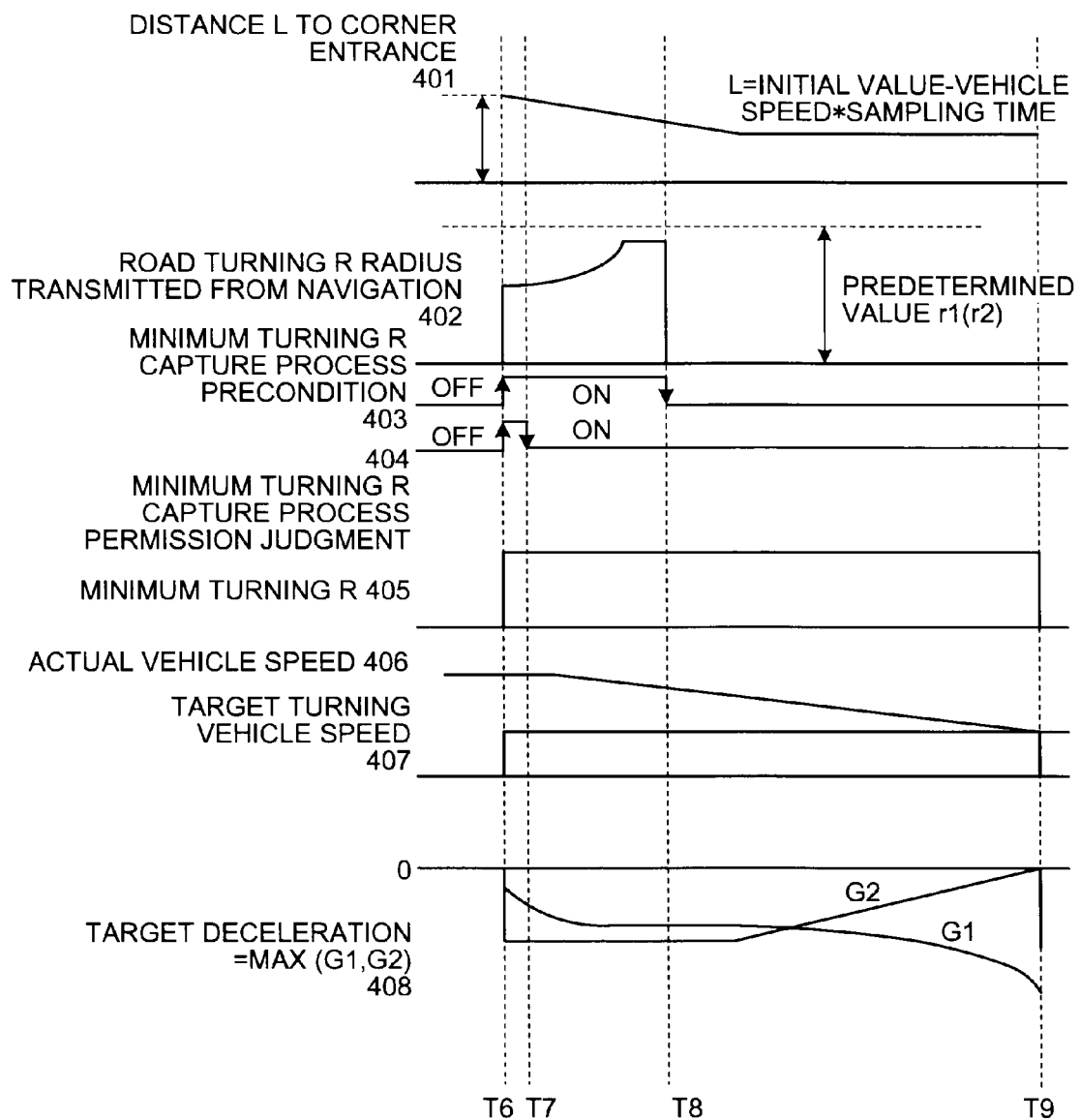
FIG. 3 is a time chart illustrating operation of a second embodiment of the braking/driving force control apparatus according to the present invention.

Next, a second embodiment is described with reference to FIG. 3.

The second embodiment relates to control in a case in which the small road turning-radius R information is suddenly input such as a case of recovering from the communication failure. In the second embodiment, the description of the portion common to the above-described first embodiment is omitted, and only the characteristic portion thereof is described.

In the second embodiment, when the small road turning-radius R information is suddenly input such as a case of recovering from the communication failure in the middle of the control, since the minimum turning-radius capture process precondition 403 of the previous cycle is set to OFF (step S009 in FIG. 1 (Yes)), the minimum turning-radius capture process permission judgment 404 is set to ON (step S011). When the road turning-radius R is within the predetermined value r2 set in advance (step S008 (Yes)), and the capture process of the minimum turning-radius is permitted (step S011), the capture process of the minimum turning-radius is started (step S014 (Yes), step S015).

[Before Time Point T6]

Before a time point T6, since the road turning-radius grad(i) (402) is read as 0 due to the communication failure, the step S002 turns out negative and the minimum turning-radius capture process precondition 403 is set to OFF (step S006). Therefore, the step S007 turns out negative, and at the step S013, the minimum turning-radius capture process permission judgment 404 is set to OFF. Therefore, although the step S014 turns out negative and the procedure shifts to the step S016, the minimum turning-radius 405 is not captured yet, so that the deceleration control is not carried out.

[Time Point T6]

At the time point T6, the road turning-radius grad(i) (402) is suddenly input as a small value after recovering from the communication failure, and the value of the road turning-radius grad(i) (402) is read at the step S001. Therefore, since the steps S002 and S003 turn out positive, the minimum turning-radius capture process precondition 403 is set to ON at the step S004. Therefore, the following step S007 turns out positive, and since the road turning-radius grad(i) (402) is smaller than the second predetermined value r2 at the step S008, this turns out positive and the procedure shifts to the step S009.

At the step S009, since the minimum turning-radius capture process precondition 403 in the previous cycle (before the time point T6) is set to OFF, this turns out positive. Therefore, the minimum turning-radius capture process permission judgment 404 is set to ON at the step S011, and the step S014 turns out positive, so that the capture process of the minimum turning-radius 405 is carried out at the step S015.

[Time Period after Time Point T6 Until Time Point T7]

Operation during a time period after the time point T6 until a time point T7 is similar to the operation at the above-described time point T6.

[Time Point T7]

At the time point T7, operation in the order of the step S001→the step S002 (Yes)→the step S003 (Yes)→the step S004→the step S007 (Yes)→the step S008 (Yes)→the step S009 (No) is carried out. At the time point T7, it is detected that the road turning-radius grad(i) (402) has started increasing. Therefore, at the time point T7, it is judged that the road turning-radius grad(i) (402) does not decrease by a value not smaller than the third predetermined value r3 from the road turning-radius grad (i−1) in the previous cycle (step S010 (No)), and it is judged that the road turning-radius grad(i) (402) increases by a value not smaller than the fourth predetermined value r4 from the road turning-radius grad(i−1) in the previous cycle (step S012 (Yes)), so that the procedure shifts to the step S013.

At the step S013, when the minimum turning-radius capture process permission judgment 404 is set to OFF, the step S014 turns out negative. Thereby, the update of the minimum turning-radius 405 and the target turning vehicle speed 407 (step S015) is not carried out, and at the step S016, the target deceleration 408 is obtained based on the newest (at the time period T7) minimum turning-radius 405 and the target turning vehicle speed 407, and the deceleration control is started based on the target deceleration 408. Thereby, the actual vehicle speed 406 decreases some time after the time point T7.

[Time Period after Time Point T7 Until Time Point T8]

Operation during a time period after the time point T7 until a time point T8 is similar to the operation at the above-described time point T7.

[Time Point T8]

At the time point T8, since the road turning-radius grad(i) (402) is 0, the step S002 turns out negative and the procedure shifts to the step S006, and the minimum turning-radius capture process precondition 403 is set to OFF. Since the following step S007 turns out negative, the procedure shifts to the step S013. At the step S013, the minimum turning-radius capture process permission judgment 404 is set to OFF (this is already set to OFF at the time point T7 in this example). In this case, since the step S014 also turns out negative, so that the deceleration control is continuously carried out at the step S016.

[After Time Point T8]

After the time point T8, the operation is similar to the operation at the above-described time point T8.

According to the second embodiment, even when the small road turning-radius R information is suddenly input such as when recovering from the communication failure, the minimum turning-radius can be surely captured.

Third Embodiment

Figure 4:
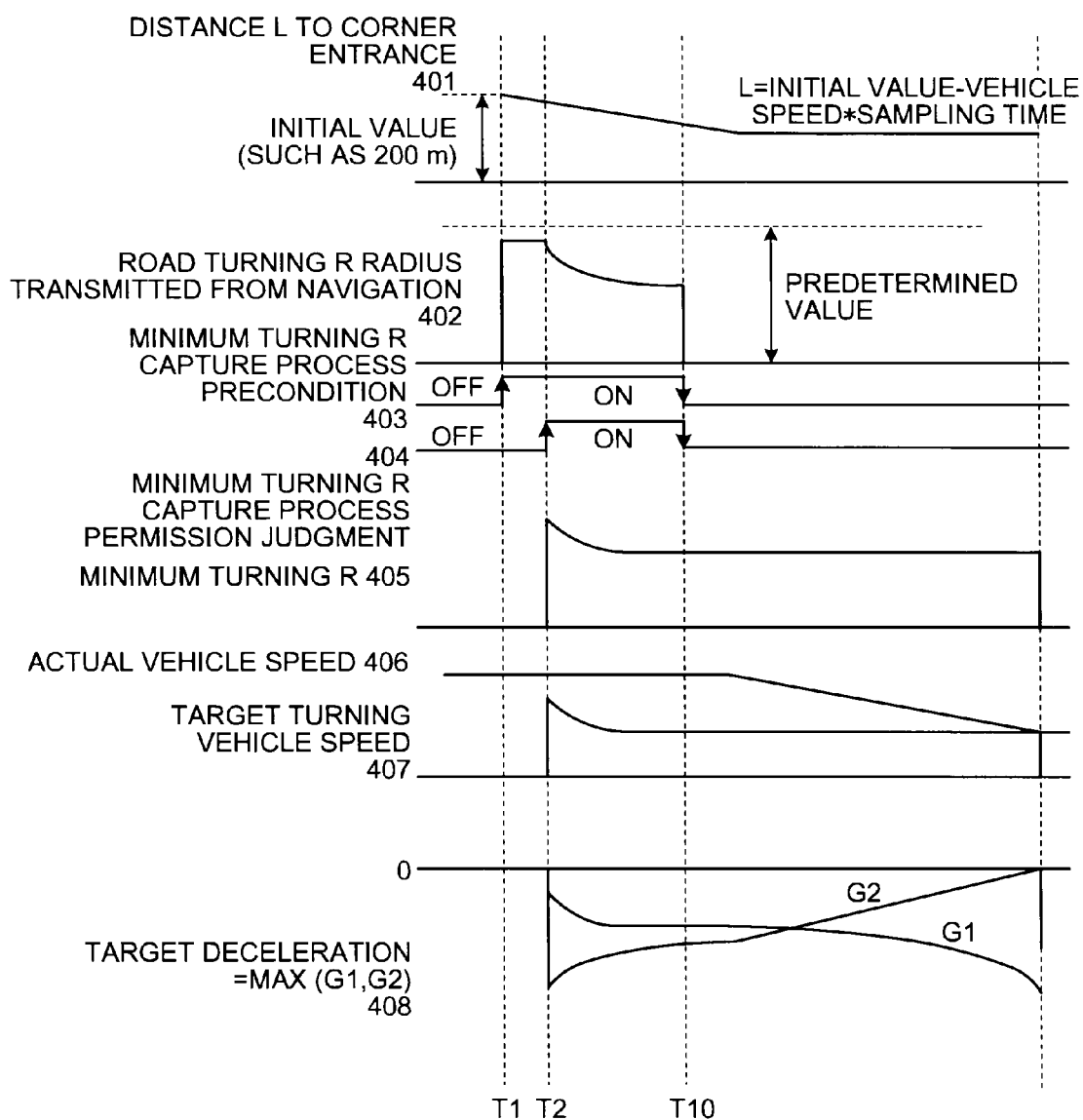
FIG. 4 is a time chart illustrating operation of a third embodiment of the braking/driving force control apparatus according to the present invention.

Next, a third embodiment is described with reference to FIG. 4.

The third embodiment relates to control in a case in which the road turning-radius R information suddenly disappears due to the communication failure or the like and the road turning-radius R=0. In the third embodiment, the description of the portion common to the above-described first embodiment is omitted and only the characteristic portion thereof is described.

In the above-described first embodiment, the judgment of capture completion of the minimum turning-radius is performed when the transmitted road turning-radius R increases (step S012). In the third embodiment, when the information of the road turning-radius R suddenly disappears in the middle of the control due to the communication failure and the road turning-radius R=0, the capture process of the minimum turning-radius is prohibited and the update of the minimum turning-radius is stopped (the step S002 (No)→the step S006→the step S007 (No)→the step S013).

[Time Period after Time Point T1 and Before Time Point T10]

Operation during a time period after the time point T1 and before a time point T10 is similar to the operation in above-described FIG. 2.

[Time Point T10]

At the time point T10, the road turning-radius grad(i) (402) is read as 0 due to the communication failure. Therefore, the step S002 turns out negative, and the minimum turning-radius capture process precondition 403 is set to OFF at the step S006. Since the following step S007 turns out negative, the minimum turning-radius capture process permission judgment 404 is set to OFF at the step S013. Thereby, the step S014 turns out negative and the step S016 is carried out. That is to say, the capture process of the minimum turning-radius is prohibited, the update of the minimum turning-radius 405 and the target turning vehicle speed 407 (step S015) is stopped, the target deceleration 408 is obtained based on the newest (at the time period T10) minimum turning-radius 405 and target turning vehicle speed 407, and the deceleration control is started based on the target deceleration 408. Thereby, the actual vehicle speed 406 decreases some time after the time point T10.

According to the third embodiment, even when the road turning-radius R information suddenly becomes 0 due to the communication failure or the like, it is possible to carry out the driving force control based on the minimum turning-radius captured by then without adopting the value at the time of the communication failure.

According to the above-described first to third embodiments, the following technique is disclosed.

(Item 1)

A target turning vehicle speed setting apparatus for setting a target turning vehicle speed (407) based on a corner radius (road turning-radius grad(i) (402)) obtained from external information (navigation system device 95), wherein a reference radius when setting the target turning vehicle speed is set to a minimum value (405) of values of the corner radius at a plurality of points included in a corner obtained from the external information at any time.

(Item 2)

The target turning vehicle speed setting apparatus according to Item 1, wherein an update of the reference radius is started (step S011) when the value of the corner radius at the plurality of points included in the corner obtained from the external information at any time decreases (step S010 (Yes)), and the update of the reference radius is finished (step S013) when the value of the corner radius at the plurality of points included in the corner obtained from the external information at any time increases (step S012 (Yes)).

(Item 3)

The target turning vehicle speed setting apparatus according to Item 2, wherein the update of the reference radius is finished without adopting the value of 0 (step S014 (No)), after starting the update of the reference radius, when the value of the corner radius at the plurality of points included in the corner obtained from the external information at any time becomes 0 (step S002 (No)).

(Item 4)

The target turning vehicle speed setting apparatus according to Item 2 or 3, wherein the update of the reference radius is started, before starting the update of the reference radius (step S009 (Yes)), when the value of the corner radius at the plurality of points included in the corner obtained from the external information at any time is not larger than a value set in advance (step S008 (Yes)).

(Item 5)

A braking/driving force control apparatus for setting a target turning vehicle speed based on a corner radius obtained from external information and controlling braking/driving force based on the target turning vehicle speed, wherein a target turning vehicle speed set by the target turning vehicle speed setting apparatus according to any one of Items 1 to 4 is used as the target turning vehicle speed.

(Item 6)

The braking/driving force control apparatus according to Item 5, wherein braking/driving force control based on the target turning vehicle speed is permitted when the update of the reference radius is finished (step S013, step S014 (No)).

INDUSTRIAL APPLICABILITY

As described above, the target turning vehicle speed setting apparatus and the braking/driving force control apparatus according to the present invention are useful as the target turning vehicle speed setting apparatus and the braking/driving force control apparatus for setting the target turning vehicle speed when the vehicle travels a corner based on the radius information of a plurality of points included in the corner externally transmitted at any time, and particularly they are suitable for setting a more appropriate target turning vehicle speed.

The invention claimed is:

1. A target turning vehicle speed setting apparatus for setting a target turning vehicle speed based on a corner radius obtained from external information, the apparatus comprising:
   an input unit that receives external information including a corner radius in front of a vehicle from an outside; and
   a control unit that sets a target turning vehicle speed based on the corner radius received by the input unit, wherein
   when the control unit sets the target turning vehicle speed
      a reference radius is set to a minimum value of values of the corner radius at a plurality of points included in a corner obtained from the external information at any time,
   the control unit starts an update of the reference radius when the value of the corner radius at the plurality of points included in the corner obtained from the external information at any time decreases, and
   the control unit finishes the update of the reference radius when the value of the corner radius at the plurality of points included in the corner obtained from the external information at any time increases.

2. The target turning vehicle speed setting apparatus according to claim 1, wherein
   the control unit finishes the update of the reference radius without adopting the value of zero, after starting the update of the reference radius, when the value of the corner radius at the plurality of points included in the corner obtained from the external information at any time becomes zero.

3. The target turning vehicle speed setting apparatus according to claim 2, wherein
   the control unit starts the update of the reference radius, before starting the update of the reference radius, when the value of the corner radius at the plurality of points included in the corner obtained from the external information at any time is not larger than a value set in advance.

4. The target turning vehicle speed setting apparatus according to claim 1, wherein
   the control unit starts the update of the reference radius, before starting the update of the reference radius, when the value of the corner radius at the plurality of points included in the corner obtained from the external information at any time is not larger than a value set in advance.

5. A braking/driving force control apparatus for setting a target turning vehicle speed based on a corner radius obtained from external information and controlling braking/driving force based on the target turning vehicle speed, the apparatus comprising:
   an input unit that receives external information including a corner radius in front of a vehicle from an outside;
   a control unit that sets a target turning vehicle speed based on the corner radius received by the input unit; and
   a deceleration control device capable of controlling deceleration of the vehicle, wherein
   the control unit uses a target turning vehicle speed set by the target turning vehicle speed setting apparatus according to claim 1 as the target turning vehicle speed.

6. The braking/driving force control apparatus according to claim 5, wherein the control unit permits a braking/driving force control based on the target turning vehicle speed from after the update of the reference radius is finished.

7. A target turning vehicle speed setting method for setting a target turning vehicle speed based on a corner radius obtained from external information, the method comprising:
receiving external information including a corner radius in front of a vehicle from an outside; and
setting a target turning vehicle speed based on the received corner radius, wherein
a reference radius when setting the target turning vehicle speed is set to a minimum value of values of the corner radius at a plurality of points included in a corner obtained from the external information at any time,
wherein an update of the reference radius is started when the value of the corner radius at the plurality of points included in the corner obtained from the external information at any time decreases, and
the update of the reference radius is finished when the value of the corner radius at the plurality of points included in the corner obtained from the external information at any time increases.

8. The target turning vehicle speed setting method according to claim 7, wherein
the update of the reference radius is finished without adopting the value of zero, after starting the update of the reference radius, when the value of the corner radius at the plurality of points included in the corner obtained from the external information at any time becomes zero.

9. The target turning vehicle speed setting method according to claim 7, wherein
the update of the reference radius is started, before starting the update of the reference radius, when the value of the corner radius at the plurality of points included in the corner obtained from the external information at any time is not larger than a value set in advance.

10. The target turning vehicle speed setting method according to claim 7, further comprising controlling braking/driving force based on the target turning vehicle speed.

11. The target turning vehicle speed setting method according to claim 10, wherein a braking/driving force control based on the target turning vehicle speed is permitted from after the update of the reference radius is finished.

12. The target turning vehicle speed setting method according to claim 8, wherein
the update of the reference radius is started, before starting the update of the reference radius, when the value of the corner radius at the plurality of points included in the corner obtained from the external information at any time is not larger than a value set in advance.

* * * * *